Aug. 14, 1945.  R. PASH  2,382,903
LAPPING MACHINE
Filed July 10, 1943  4 Sheets-Sheet 1
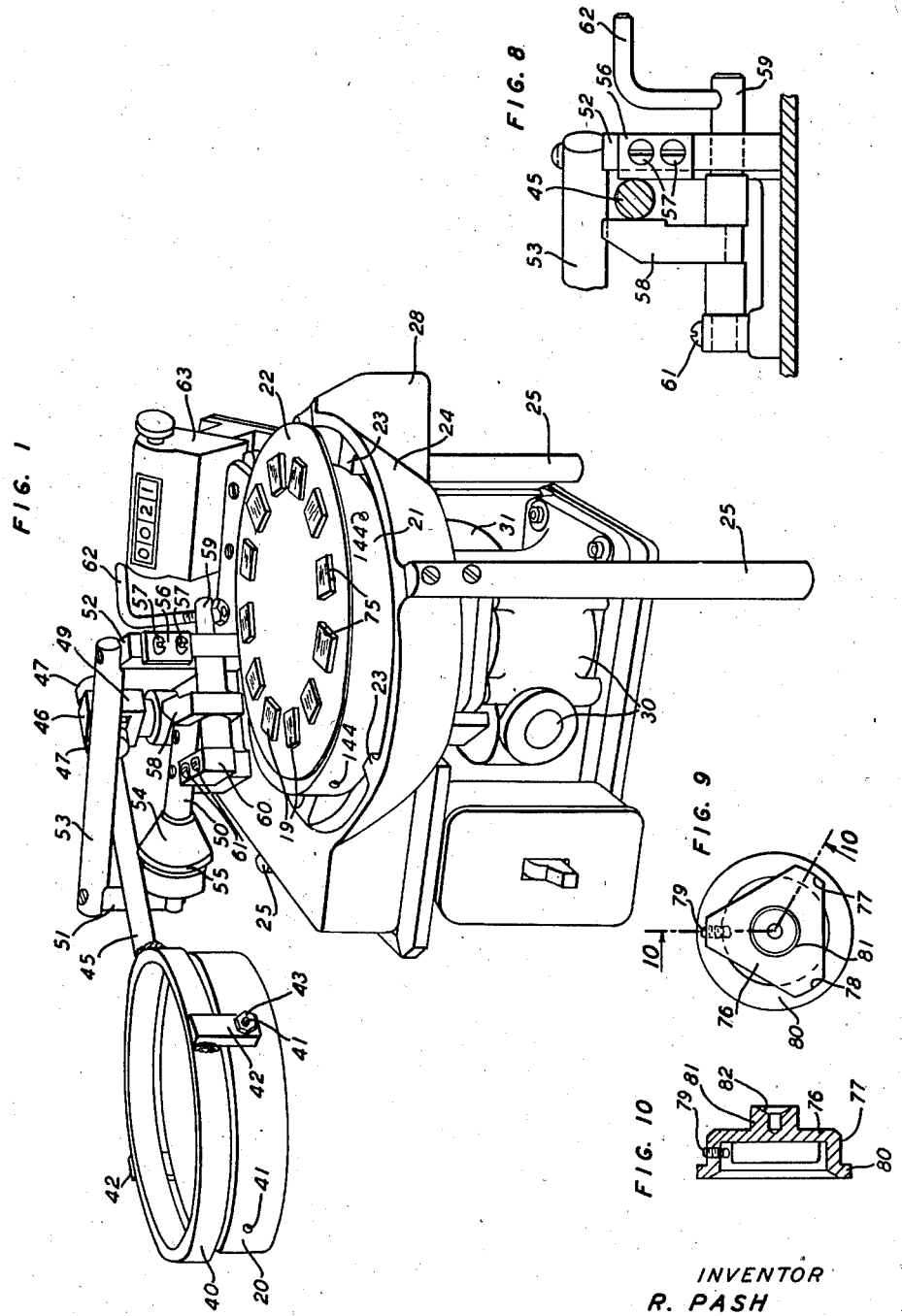
INVENTOR
R. PASH
BY
E.B. Nowlan
ATTORNEY Aug. 14, 1945.   R. PASH   2,382,903
LAPPING MACHINE
Filed July 10, 1943   4 Sheets-Sheet 2
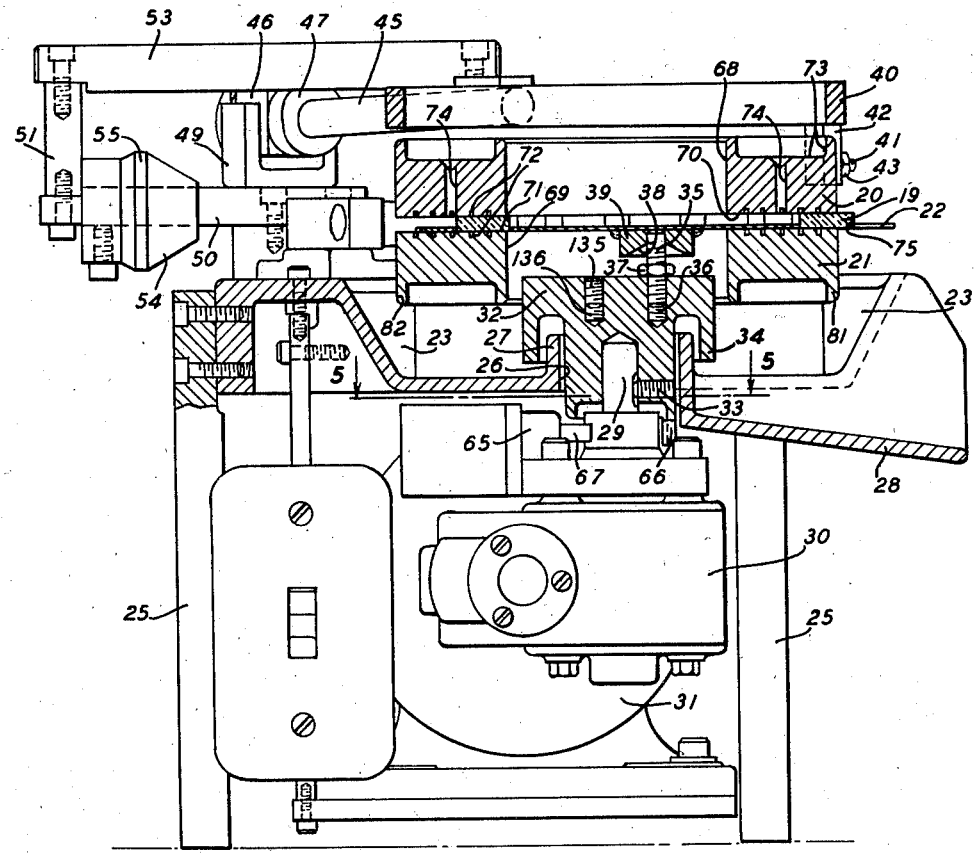
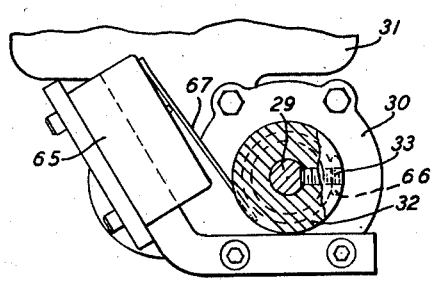
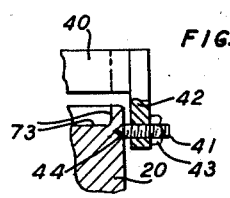
INVENTOR
R. PASH
BY
E. R. Nowlan
ATTORNEY Aug. 14, 1945.   R. PASH   2,382,903
LAPPING MACHINE
Filed July 10, 1943   4 Sheets-Sheet 3

INVENTOR
R. PASH
BY
E. R. Nowlan
ATTORNEY

Aug. 14, 1945.　　　　　R. PASH　　　　　2,382,903
LAPPING MACHINE
Filed July 10, 1943　　　　4 Sheets-Sheet 4
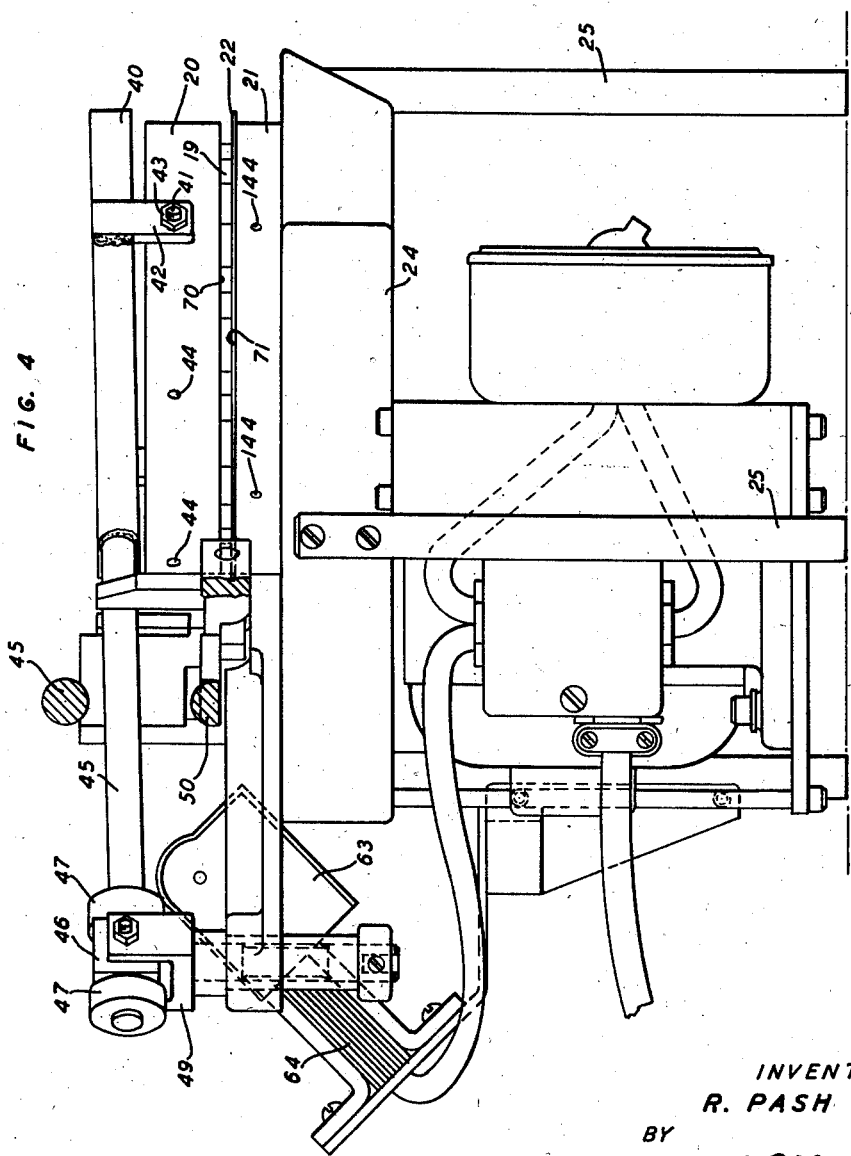
INVENTOR
R. PASH
BY
E. R. Nowlan
ATTORNEY Patented Aug. 14, 1945

2,382,903

UNITED STATES PATENT OFFICE 2,382,903

LAPPING MACHINE

Robert Pash, Roselle, N. J., assignor to Western Electric Company, Incorporated, New York, N. Y., a corporation of New York Application July 10, 1943, Serial No. 494,193

2 Claims. (Cl. 51—161)

This invention relates to a lapping machine, and more particularly to a machine for lapping quartz crystal slices such as are used in various electrical arts.

For various uses in electrical arts it is necessary to employ small slices of crystalline quartz having their flat faces formed to be flat and parallel to an extreme degree of accuracy, and the slices being further formed to have to a great degree of accuracy, a predetermined thickness. Such slices are rough cut and formed in various ways, and are ground or "cut" to approximately the desired thickness, flatness and parallelism. The final step of lapping these nearly finished slices down to the finished product is a tricky and difficult task, especially on a production basis.

An object of the present invention is to provide an improved apparatus for simultaneously lapping both sides of each of a plurality of laminar objects of substantially equal thickness, rapidly, accurately and dependably, to produce to a high degree of accuracy parallel plane faces spaced a predetermined distance apart.

With the above and other objects in view, the invention may be illustratively embodied in an apparatus for simultaneously lapping opposite faces of laminar articles and comprising a stationary annular lower lap, a centrally imperforate disk-like nest having annularly disposed work piece receiving openings therein and resting on the lower lap, an annular upper lap to rest on work pieces held in the nest, and gimbal mountings for the upper lap to maintain the same in position on the work pieces in the nest with freedom to tilt to follow the gross combined surfaces of the work pieces.

Other objects and features of the invention will appear from the following detailed description of one embodiment thereof, taken in connection with the accompanying drawings, in which the same reference numerals are applied to identical parts in the several figures and in which Fig. 1 is a perspective view of an apparatus constructed in accordance with the invention;

Fig. 2 is a front elevation partly in transverse section thereof with parts in another position;

Fig. 4 is a left side elevation of the showing of Fig. 2 with parts broken away;

Fig. 5 is an enlarged detail view on the line 5—5 of Fig. 2;

Fig. 6 is an enlarged detail view on the line 6—6 of Fig. 3;

Fig. 8 is a detail view on the line 8—8 of Fig. 3;

Fig. 9 is a detached reverse plan view of the lap truing plug; and

Fig. 10 is a section on the line 10—10 of Fig. 9.

Figure 3:
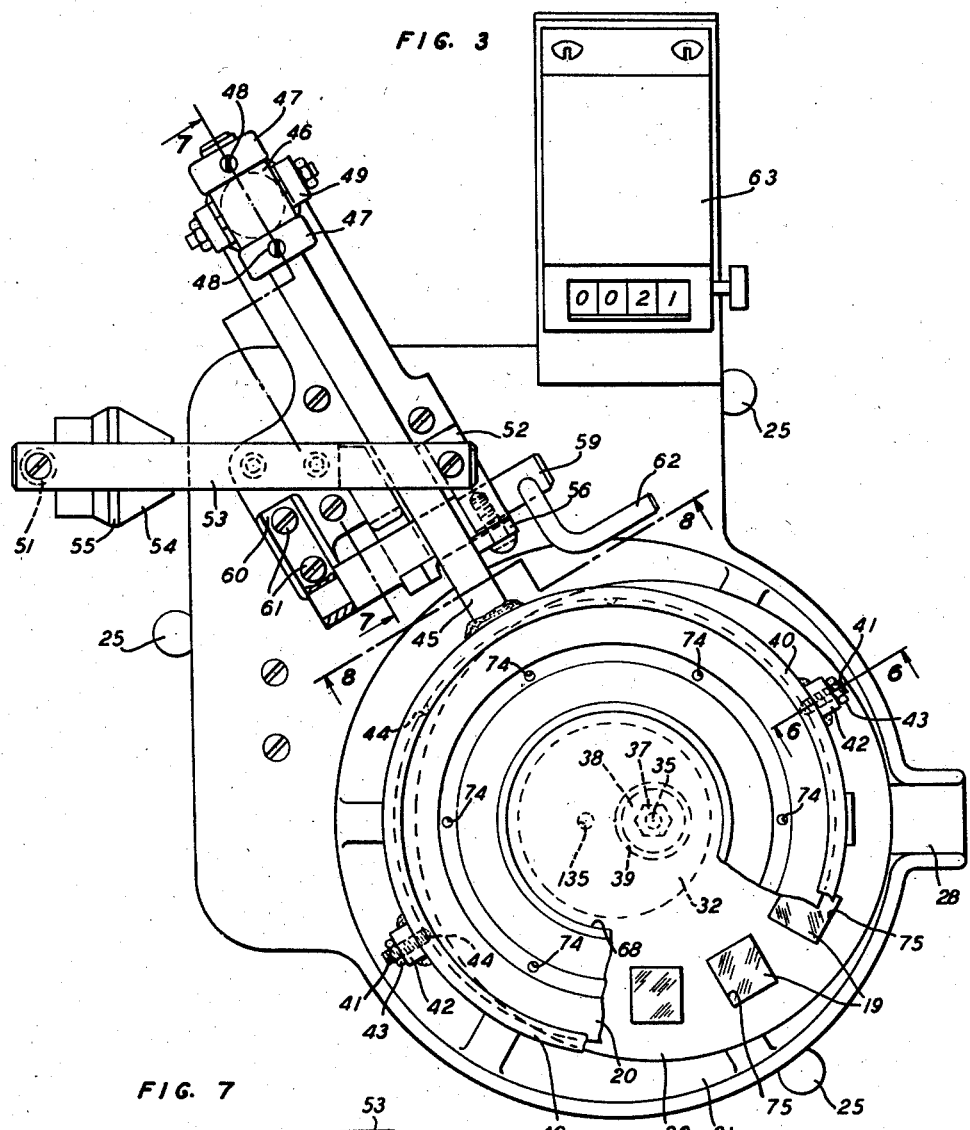
Fig. 3 is a plan view of the showing of Fig. 2 with parts broken away.

The invention is herein disclosed as embodied in an apparatus for simultaneously lapping both sides of a plurality of laminar articles of approximately equal thickness. Fundamental elements are two cylindrically annular lapping blocks 20 and 21, normally superimposed, as in Fig. 2, but with the upper lap 20 arranged to be lifted and carried to one side, as in Fig. 1. An article nest 22 is normally disposed between the two laps 20 and 21. The nest 22 is a thin plate of slightly less thickness than the final thickness to which artcles are to be lapped, and may be of any suitable material, e. g., some rust resisting metal or alloy, hard rubber, plastic compound or the like. In the particular apparatus disclosed, the articles 19 to be lapped are small square slices of crystalline quartz. For clarity of understanding, the thickness of these slices relative to the thickness of the nest has been considerably exaggerated in the drawings.

The lower block or lap 21 rests on supports 23 formed in a basin 24 supported on legs 25. In the bottom of the basin is a large central aperture 26 with a flange 27 upturned around its rim. A spillway 28 leads through the side wall of the basin at the right. The output shaft or drive shaft 29 of a reduction gear 30, driven by a motor 31, extends vertically up through the aperture 26 and supports an interchangeable driving head 32 secured on the shaft 29 by a set screw 33. The under side of the head has a pendent skirt 34 extending downward outside and below the top of the flange 27. A vertical, threaded drive pin 35 is mounted in a correspondingly threaded vertical bore 36 in the top of the head 32 and offset laterally from the axis of rotation of the head. The pin 35 is held at an adjustable height in the bore 36 by means of a jam nut 37. Other bores, such as 136, may be formed in the head at other offset distances from the axis of the head and may be closed when not in use by screws 135.

The top end of the pin 35 enters a funnel-shaped recess 38 ending in a correspondingly formed bottom in an eyelet member 39 secured to the center of the under side of the nest 22. The pin 35 fits neatly but not snugly into the recess 38, being free to turn therein but without appreciable freedom to move therein otherwise.

The upper lap 20 rests on and is supported wholly by the crystal slices 19. Above this lap is a gimbal ring 40 to which the lap 20 is pivotally attached by two pointed bearing screws 41 passing through corresponding threaded bores in downwardly extending lugs 42 secured to the ring 40 and locked in place by jam nuts 43, as best shown in Fig. 6. The screws 41 enter corresponding conical recesses 44 in the cylindrical side wall of the lap 20 at opposite ends of a diameter thereof. Preferably the lap is provided with several pair of such recesses, as shown. The lap 21 is also provided with identically similar recesses 144 for a reason to be explained hereinafter.

Figure 7:
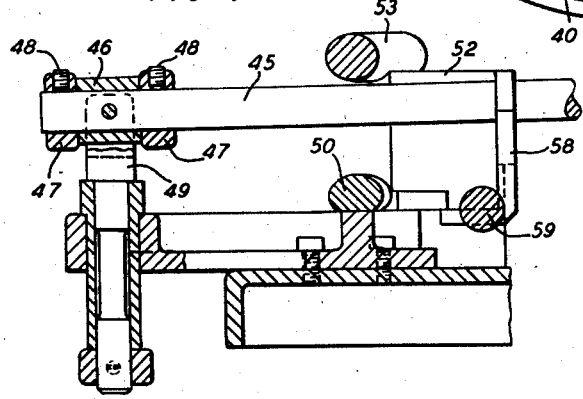
Fig. 7 is a detail view on the line 7—7 of Fig. 3.

The ring 40 is secured to one end of a supported rod 45 extending outwardly from the ring, in the plane thereof, and at right angles to a line through the screws 41, 41. The other end of the rod is journalled, to be freely rotatable about its axis, in a bearing 46 and held against longitudinal motion therein by collars 47, 47 and set screws 48, 48, as best shown in Fig. 7. Thus the lap 20 is tiltable about the axis of the screws 41 and also about the axis of the rod 45 to follow irregularities in the combined surface of the crystal slices 19. The bearing 46 is pivotally supported in a yoke 49, so that the rod 45 is also pivotable vertically about a horizontal axis at right angles to its own axis. The yoke 49 is mounted in the machine frame to be pivotable about a vertical axis, to allow the lap 20 to be swung into either of the positions shown respectively in Figs. 1 and 3. The position of Fig. 1 may be termed the loading position, and that of Fig. 3 the lapping or operating position. As the rod 45 swings between these two extreme positions, it moves within and is limited by a rectangular frame consisting of a bottom crossbar 50 rigidly secured on the machine frame, an upright outer post 51 secured on the bar 50, an upright inner post 52 mounted on the machine frame, and a top crossbar 53 mounted on the two posts.

When the lap 20 is in the lapping position (Fig. 3) and it is desired to move it to the loading position (Fig. 1) to inspect the work or to re-load the nest or for any other reason, it is generally preferable to slide the lap 20 laterally away without lifting it from the work, lest pieces of work adhere to the lap 20 and be lifted out of the nest and thus displaced or even carried away, but when this lap is returned to the lapping position it is generally preferable to lift it across to a position over the nest and lower it into place, lest pieces of work be knocked out of the nest. Hence the frame just described is made high enough inside to permit of these movements. For convenience the tapered retaining member 54 with a flange 55 behind which the rod 45 is removably held against accidental displacement in the loading position, is mounted on the outer portion of the bar 50.

A stop member 56 is mounted on the post 52 by means of screws 57 entering corresponding bores in the post and passing through oversize holes in the member 56 so that this latter is shiftably adjustable on the post. The rod 45 when swung into operating position, stops against the member 56; and this is made adjustable as described in order to locate the lap 20 accurately over the lap 21. To retain the lap 20 in this position, a latch 58 is rigidly mounted on a shaft 59 journalled in the post 52 and also in a bearing 60 mounted on the machine frame. The bearing 60 is held in place by screws 61 passing through oversize holes in a bearing body and into the machine frame. Thus the bearing 60 may be adjusted to move the shaft 59 longitudinally of itself to allow just space enough between the latch 60 and the stop 56 for the rod 45 to fit between when the lap 20 is accurately in operating position. The latch may be turned into its operative position, best shown in Fig. 8, or back out of the way, as in Fig. 1, by means of a handle 62 on the shaft 59.

A counting device 63 actuated by a solenoid 64 may be mounted conveniently on the machine frame and actuated by a micro-switch 65 mounted conveniently on the casing of the reduction gear 30 adjacent to the shaft 29. The skirt 34 of the driving head 32 may then have a downwardly projecting finger 66 to actuate the lever 67 of the micro-switch 65 once at each revolution of the head.

The two laps 20 and 21 are identically alike in size and shape. The central apertures 68 and 69 respectively are of the same diameter and depth. Each has a plane lapping face, 70 and 71 respectively, in which are formed concentric grooves 72 to aid in distributing the mixture of abrasive dust and water or other vehicle used for the lapping. This may be easily supplied, even when the machine is in operation, to the broad shallow channel 73 formed in the top surface of the lap 20 from which vertical bores 74 lead down through the body of the lap and through its lower surface 70. Since the nest 22 moves eccentrically as hereinafter described, the abrasive is also delivered through these bores to the face 71 of the lap 21. Excess abrasive material washes down over the outer and inner faces of the lap 21 into the basin 24 and is discharged into any convenient receptacle (not shown), through the spillway 28. The skirt 34 on the head 32 and the flange 27 on the bowl 24 prevent access of the abrasive to the driving unit and its bearings below the shaft 29.

With the machine in the position shown in Fig. 1, finished work pieces 19 may be removed. Preferably, though not necessarily, the empty nest is removed and a fresh starting supply of abrasive smeared on the working face 71 of the lap 21. The nest is then replaced, which the funnel shape of the recess 38 renders simple and quick to be done. Fresh blanks are to be lapped are placed in the corresponding apertures 75 of the nest 22. Were the nest coaxial with the two laps, the apertures 75 and the work blanks in them would lie with their centers on a circle midway between the inner and outer edges of the working face 71 of the lap 21, and hence also in like relation to the face 70 of the lap 20 when the latter is in lapping position (Fig. 2). Since the center of the nest is held off center by the pin 35, this ring of work pieces is always eccentric to the two laps, as shown, when the machine is operating.

The nest having been put in place and filled with blanks, abrasive is smeared over the nest and blanks, and the top lap 20 is lifted over from the position of Fig. 1 and placed over the work in the position of Fig. 3. Abrasive is supplied to the channel 73, and the machine is started. The eccentric motion of the pin 35 then drives the nest to move eccentrically in a circle between the laps 20 and 21, rubbing the blanks against the abrasive-charged underlying and overlying laps. Fig. 2 shows an extreme rightward excursion of the nest. It will be noted that a considerable fraction of the rightmost blank 19 protrudes out from between the laps while practically all of the leftmost blanks are still between the laps. Generally speaking, therefore, there is somewhat less friction of the laps on the right side half circle of blanks than on the left half circle. Hence under the urge of the driving pin, which is freely rotatable in the eyelet 39, the nest will tend to rotate about the pin in the same direction that the nest is forced to revolve bodily between the laps. Hence the path of each blank becomes hypocycloidal instead of remaining circular, and a satisfactory pattern of uniform, effective lapping action is obtained.

To true the lapping faces of the laps 20 and 21, both originally and when required after a period of service, use is made of the device shown in Figs. 9 and 10. The nest 22 is removed from the machine, and the plug 76, dimensioned to fit into the bore 68 of the lap 20, is placed in the bore. The body of the plug is cut away as shown in the reverse plan shown in Fig. 9, so that only the arcuately corresponding short faces 77 and 78 bear against the wall of the bore 68 and are held there by the set screw 79. The flange 80 rests on top of the lap. The stem 81 extends down into the normal position of the nest eyelet 39 and is formed with a funnelled aperture 82 formed like the aperture 38 of the eyelet to receive the top of the driving pin 35. Thus the lap 20 may be driven in eccentric revolution on the lap 21. By working together in this fashion the two laps 20 and 21 and a third lap identically like either 20 or 21, in all possible combinations of pairs of the three laps, the working faces of the three are made plane.

It will be noted that in the apparatus described, when the upper lap 20 is swung aside as in Fig. 1, there is no apparatus part overhanging the field of operation. The entire nest 22 and all of its contents of work pieces 19 are unobstructedly open to view, to manipulation and to inspection, because the operating drive of the apparatus is from below the laps. Because the nest has no central perforation, being driven by means of the eyelet 39 instead of a central perforation, there is no drip of abrasive and water down upon the driving means from the nest. Excess abrasive and water run down the inner face of the stationary lap 21 and drop into the bowl; but do not run down over any moving part to be thrown around, except possibly to some small extent between the nest apertures 75 and the work pieces 19 therein. However, any drip from this runs down the skirt 34 of the head 32 into the bowl. Thus the driving mechanism is wholly protected against access of abrasive thereto even though it is located directly under the center of the field of lapping action.

The lap 21 is held solidly stationary by the shoulder 81 on the supports 23. The lap 20, when in lapping position, is held immovably in position by the latch 58 and stop member 56 acting on the support rod 45. Nevertheless, the lap 20 is free to follow irregularities in the gross, combined surface of the work pieces 19, as these are rotated by the nest 22 between the laps, by virtue of the gimbal mounting of the lap 20 in the pivot screws 41, 41 and in the bearing 46.

The embodiment disclosed and described above is illustrative and may be variously modified and departed from without departing from the spirit and scope of the invention as particularly described and pointed out in the appended claims.

What is claimed is:

1. Apparatus for simultaneously lapping opposite faces of laminar articles and comprising a stationary annular horizontally disposed lower lap, a disk-like nest having annularly disposed workpiece receiving openings therein and resting on the lower lap, an annular upper lap to rest on workpieces in the openings of the nest and resting on the lower lap, the two laps being normally substantially coaxial, means to drive the nest in circular motion eccentric to the laps, gimbal mountings to normally hold the upper lap coaxial to the lower lap with freedom to tilt as necessary to follow irregularities of the gross upper surface of the workpieces and to prevent any rotary motion of the upper lap about its axis, and supporting means secured to the gimbal mountings and movable to swing the mountings and therewith the upper lap to slide the upper lap horizontally from the workpieces into a position wholly apart from the nest and lower lap leaving the workpieces accessibly uncovered, and to swing the upper lap back into position above the lower lap and then downwardly upon workpieces thereon, the said gimbal mountings and supporting means comprising a yoke whose arms are pivotably attached to the upper lap to permit the same to rock therein in the plane of the stem of the yoke, a rotatable vertical shaft, and a substantially horizontal sleeve to receive and support the stem of the yoke therein with freedom for the yoke and the lap held in the yoke to rock transversely to the stem of the yoke, the sleeve being mounted on the shaft to be rotatable therewith.

2. Apparatus for simultaneously lapping opposite faces of laminar articles and comprising a stationary annular horizontally disposed lower lap, a disk-like nest having annularly disposed workpiece receiving openings therein and resting on the lower lap, an annular upper lap to rest on workpieces in the openings of the nest and resting on the lower lap, the two laps being normally substantially coaxial, means to drive the nest in circular motion eccentric to the laps, gimbal mountings to normally hold the upper lap as coaxial to the lower lap with freedom to tilt as necessary to follow irregularities of the gross upper surface of the workpieces to prevent any rotary motion of the upper lap about its axis, and supporting means secured to the gimbal mountings and movable to swing the mountings and therewith the upper lap to slide the upper lap horizontally from the workpieces into a position wholly apart from the nest and lower lap leaving the workpieces accessibly uncovered, and to swing the upper lap back into position above the lower lap and then downwardly upon workpieces thereon, the said gimbal mountings and supporting means comprising a yoke whose arms are pivotably attached to the upper lap to permit the same to rock therein in the plane of the stem of the yoke, a rotatable vertical shaft, and a substantially horizontal sleeve to receive and support the stem of the yoke therein with freedom for the yoke and the lap held in the yoke to rock transversely to the stem of the yoke, the sleeve being mounted on the shaft to be rotatable therewith, together with a latch to releasably hold the yoke in position when the upper lap is in operative position coaxial with the lower lap.

ROBERT PASH.